United States Patent
Cho et al.

(10) Patent No.: US 10,266,777 B2
(45) Date of Patent: Apr. 23, 2019

(54) METHOD FOR REMOVING ORGANIC ACIDS IN CRUDE OIL USING GAS HYDRATE INHIBITOR AND CATALYST

(71) Applicant: KOREA INSTITUTE OF ENERGY RESEARCH, Daejeon (KR)

(72) Inventors: Dong Woo Cho, Daejeon (KR); Jong Nam Kim, Daejeon (KR); Bharat Singh Rana, Daejeon (KR); Hee Tae Beum, Daejeon (KR); Hyung Chul Yoon, Daejeon (KR); Tae Sung Jung, Daejeon (KR); Sang Sup Han, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 15/577,635

(22) PCT Filed: May 27, 2016

(86) PCT No.: PCT/KR2016/005658
§ 371 (c)(1),
(2) Date: Mar. 20, 2018

(87) PCT Pub. No.: WO2016/195337
PCT Pub. Date: Dec. 8, 2016

(65) Prior Publication Data
US 2018/0195009 A1 Jul. 12, 2018

(30) Foreign Application Priority Data
May 29, 2015 (KR) .................. 10-2015-0076358

(51) Int. Cl.
| | | |
|---|---|---|
| *C10G 29/22* | (2006.01) | |
| *C10G 53/02* | (2006.01) | |
| *E21B 43/34* | (2006.01) | |
| *B01D 17/02* | (2006.01) | |
| *B01D 3/00* | (2006.01) | |
| *B01D 17/04* | (2006.01) | |
| *B01D 19/00* | (2006.01) | |
| *C02F 1/00* | (2006.01) | |
| *C10G 31/08* | (2006.01) | |

(52) U.S. Cl.
CPC ............... *C10G 29/22* (2013.01); *B01D 3/00* (2013.01); *B01D 17/02* (2013.01); *B01D 17/047* (2013.01); *B01D 19/00* (2013.01); *C02F 1/00* (2013.01); *C10G 31/08* (2013.01); *C10G 53/02* (2013.01); *E21B 43/34* (2013.01); *C10G 2300/203* (2013.01)

(58) Field of Classification Search
CPC ................................ C10G 29/22; C10G 53/02
See application file for complete search history.

(56) References Cited

U.S. PATENT DOCUMENTS

2012/0078021 A1  3/2012  Durham et al.

FOREIGN PATENT DOCUMENTS

| CN | 1670132 A | * | 9/2005 |
|---|---|---|---|
| CN | 10-3013676 B | | 4/2013 |
| JP | 2007-507589 A | | 3/2007 |
| KR | 10-2010-0052089 A | | 5/2010 |
| KR | 10-2012-0081032 A | | 7/2012 |
| KR | 10-2013-0006055 A | | 1/2013 |

OTHER PUBLICATIONS

Y. Wang et al., Removal of Naphthenic Acids from a Vacuum Fraction Oil with an Ammonia Solution of Ethylene Glycol, 85 Fuel 2489-2493 (2006).*
J. Das and K. M. Parida, Heteropoly Acid Intercalated Zn/Al HTlc as Efficient Catalyst for Esterification of Acetic Acid Using N-Butanol, 264 J. Mol. Catal. A: Chem. 248-254 (2007).*
X. Li et al., The Removal of Naphthenic Acids from Dewaxed VGO via Esterification Catalyzed by Mg—Al Hydrotalcite, 111 Fuel Process. Technol. 68-77 (2013).*

* cited by examiner

*Primary Examiner* — Randy Boyer
(74) *Attorney, Agent, or Firm* — Rabin & Berdo, P.C.

(57) ABSTRACT

Disclosed is a method of removing organic acids from crude oil using a gas hydrate inhibitor and a catalyst in crude oil production facilities or oil-refining facilities, in which organic acids can be removed from crude oil by reacting the crude oil with mono-ethylene glycol (MEG), di-ethylene glycol (DEG), tri-ethylene glycol (TEG), methanol or derivatives thereof, as a gas hydrate inhibitor in the presence of a tungstophosphoric acid (TPA) catalyst, whereby the acidity of the crude oil can be lowered by 93% or more, and no catalyst deactivation occurs because magnesium (Mg)-based catalysts are not used. Furthermore, a continuous process is achieved in such a manner that the gas hydrate inhibitor and the catalyst are not discarded but are collected from the crude oil from which organic acids have been removed, and are thus recycled, thereby realizing environmentally friendly, economical and efficient removal of organic acids from crude oil.

18 Claims, 6 Drawing Sheets

METHOD FOR REMOVING ORGANIC ACIDS IN CRUDE OIL USING GAS HYDRATE INHIBITOR AND CATALYST

TECHNICAL FIELD

The present invention relates to a method of removing organic acids from crude oil in crude oil production facilities or oil-refining facilities, and more particularly to a method of lowering the acidity of crude oil by removing organic acids from crude oil through reaction of crude oil with a gas hydrate inhibitor such as mono-ethylene glycol (MEG), etc. in the presence of a tungstophosphoric acid (TPA) catalyst.

BACKGROUND ART

Although demand for fossil fuels such as oil, etc. is steadily increasing, oil prices are gradually rising globally with the depletion of oil. In particular, as developing countries such as China, India and the like have achieved gradual economic growth, demand for energy and crude oil is increasing day by day. From the viewpoint of supply, however, crude oil or light oil having low impurity content, especially light crude oil (API of 30 or more), which has been mainly used in oil-refining plants, is produced in gradually decreasing amounts, and crude oil is also becoming heavy.

Hence, crude oil that is inexpensive but contains large amounts of impurities such as organic acids, metal powder, etc. is receiving great attention. Specifically, in regard to oil wells for light oil, heavy oil, crude oil extracted from shallow or deep seas, tight oil, and other unconventional oils, having high impurity content, which have not been developed to date owing to low economic benefits thereof, many countries and companies have become interested in and are actually participating in the development thereof.

In particular, among oil wells for new exploration and oil production, in oil wells of South America including Brazil, Venezuela and Colombia, Africa and some parts of the North Sea, crude oil having high organic acid content is found and produced in a large amount and is being traded at a discount rate of about 7 to 25% depending on the impurity content.

The acidity of crude oil is increased with an increase in the amount of organic acid contained in crude oil. In order to measure the acidity of crude oil, the total acid number (TAN) is used, which means the amount (mg) of potassium hydroxide (KOH) consumed to neutralize the acid contained in 1 g of oil. Crude oil is classified into low-acidity crude oil when the TAN is less than 0.5, acidic crude oil when the TAN ranges from 0.5 to 1.0, and high-acidity crude oil when the TAN exceeds 1.0, and crude oil having high acidity and thus a low price is classified as either acidic crude oil or high-acidity crude oil.

The main ingredient of organic acid, which increases the acidity of crude oil, is widely known to be naphthenic acid. Naphthenic acid is a generic term for saturated carboxylic acids having a naphthene nucleus, which is a paraffinic hydrocarbon having a long chain structure containing cyclopentane, with a carboxylic acid group (—COOH) as a main functional group at the terminal thereof.

In the case where naphthenic acid is fed continuously or in a large amount to a crude oil production or oil-refining process, the surface of the metal in contact with crude oil in plant facilities may corrode, which may cause frequent component replacement, and furthermore, problems, such as plugging of pipes due to the metal compound formed by the bonding of the naphthenic acid and the metal material and inhibition of heat exchange in the facilities, may occur.

However, it is very difficult to effectively remove or treat naphthenic acid because of the variety of detailed chemical structures and compositions thereof.

Techniques for lowering the acidity of crude oil were studied by the world's major oil companies from the 1980s to the early 1990s. After the 1990s, however, such studies were discontinued due to low oil prices, and as a result, there are no processes currently available for lowering the acidity of crude oil.

Crude oil used mainly in oil-refining plants is low-acidity crude oil having TAN of 0.5 or less, but the use of high-acidity crude oil is gradually increasing because of the economic benefits thereof. Currently, high-acidity crude oil is treated in a manner in which the high-acidity crude oil is partially diluted with a large amount of low-acidity light crude oil to thus adjust the TAN to 0.5 or less, and is then introduced to an oil-refining process together with a corrosion inhibitor. Briefly, there is required a technique for efficiently lowering the acidity of crude oil by removing organic acids from crude oil.

Meanwhile, crude oil is usually transported to oil-refining facilities via pipelines, oil tank trucks or oil tank ships. Here, when the transport conditions are low temperature and high pressure, a gas hydrate may be formed.

A gas hydrate is a solid material, and is configured such that small gas molecules such as methane, ethane, propane, carbon dioxide, and the like are physically bonded to the voids in the three-dimensional lattice structures formed by the hydrogen bond between water molecules, rather than being chemically bonded. Since such a gas hydrate may block pipes or damage storage tanks, it must be prevented from being formed using an inhibitor.

The gas hydrate inhibitor may cause economic and environmental problems due to the disposal thereof, including separation and then discharge to the sea, after transport of crude oil.

The present inventors have ascertained that when a gas hydrate inhibitor, such as mono-ethylene glycol (MEG), di-ethylene glycol (DEG), tri-ethylene glycol (TEG), methanol or derivatives thereof, is reacted with crude oil in the presence of a catalyst, organic acids may be removed from the crude oil and thus the acidity of the crude oil may be lowered.

Furthermore, the present inventors have paid attention to the problem in which the use of an alkaline earth metal-based catalyst including magnesium (Mg) may cause catalyst deactivation because magnesium may dissolve in water, which is a byproduct of the organic acid removal reaction, or may participate in the reaction, and thus have been ascertained that the above problem may be solved using tungstophosphoric acid (TPA) as a catalyst, rather than the alkaline earth metal-based catalyst including magnesium, thus culminating in the present invention.

CITED REFERENCE (Patent Document 1) Korean Patent Application Publication No. 2013-0006055 (Jan. 16, 2013)
(Patent Document 2) Korean Patent Application Publication No. 2010-0052089 (May 19, 2010)

DISCLOSURE

Technical Problem

Accordingly, the present invention has been made keeping in mind the problems encountered in the related art, and the present invention is intended to provide a method of lowering the acidity of crude oil by removing organic acids from the crude oil through reaction of the crude oil with a gas hydrate inhibitor such as MEG (Mono-ethylene glycol), etc. in the presence of a catalyst, the method being suitable for crude oil treatment so as to be applicable to land or offshore crude oil production facilities or oil-refining facilities.

In addition, the present invention is intended to provide a TPA (tungstophosphoric acid) catalyst, rather than an alkaline earth metal-based catalyst including magnesium (Mg), in order to solve the problem of catalyst deactivation.

In addition, the present invention is intended to provide a continuous process in which the gas hydrate inhibitor and the catalyst are collected from crude oil from which organic acids have been removed, and are thus recycled, thereby realizing the environmentally friendly, economical and efficient removal of organic acids from crude oil.

Technical Solution

With the goal of solving the problems encountered in the related art, the present invention provides a method of removing an organic acid from crude oil upon the treatment of crude oil in crude oil production facilities, the method including the step of removing an organic acid from crude oil by introducing crude oil 23 with a gas hydrate inhibitor 21 and a catalyst 22, the gas hydrate inhibitor including at least one selected from the group consisting of MEG (Mono-ethylene glycol), DEG (Di-ethylene glycol), TEG (Tri-ethylene glycol), methanol and derivatives thereof.

The method may further include the step of separating crude oil 29, subjected to the step of removing the organic acid, into a gas phase 24, an oil phase 25 and a water phase 26, and may also include the steps of separating water 27 from the oil phase 25; water-treating the water phase 26 and the water 27 to separate a slurry phase 32 and a water phase 33 therefrom; separating the catalyst 22 from the slurry phase 32; separating the gas hydrate inhibitor 21 from the water phase 33; recycling the gas hydrate inhibitor 21 and the catalyst 22 by introducing the same to the crude oil 23, or alternatively, may also include the steps of separating water 27 from the oil phase 25; water-treating the water phase 26 and the water 27 to remove impurities therefrom; separating the gas hydrate inhibitor 21 from the water-treated water phase 33; and additionally removing the organic acid by introducing the separated gas hydrate inhibitor 21 to the oil phase from which the water 27 has been separated. The step of separating the water from the oil phase may be designed to proceed after the step of additionally removing the organic acid.

The method of removing the organic acid may further include the steps of separating the gas hydrate inhibitor 21 from the wastewater 28 and recycling the gas hydrate inhibitor 21 and the catalyst 22 by introducing the same to the crude oil 23, or may further include the steps of water-treating the wastewater 28 to remove impurities therefrom, separating the gas hydrate inhibitor 21 from water-treated wastewater 30, and recycling the gas hydrate inhibitor 21 and the catalyst 22 by introducing the same to the crude oil 23.

Meanwhile, the present invention may be applied to the process of treating crude oil in oil-refining facilities, and particularly provides a method of removing an organic acid, comprising the step of removing an organic acid by introducing crude oil 41 with a gas hydrate inhibitor 46a and a catalyst 46b so as to react.

The method of removing the organic acid may further include the steps of desalting the crude oil 41 before the introduction with the gas hydrate inhibitor 46a and the catalyst 46b, heating the crude oil, introduced with the gas hydrate inhibitor 46a and the catalyst 46b, before the reaction, and separating unreacted gas hydrate inhibitor and catalyst 47 from the crude oil, subjected to the step of removing the organic acid, through atmospheric distillation, or the heating step may be configured so as to proceed after the step of removing the organic acid.

Also, the method may further include, in addition to the step of removing the organic acid, the steps of mixing the crude oil introduced with the gas hydrate inhibitor 46a and the catalyst 46b, before the reaction, and separating a mixture 52 comprising the unreacted gas hydrate inhibitor, catalyst and water from the crude oil from which the organic acid has been removed, through desalting with water 51.

The method of the invention may further include the step of transporting crude oil from a crude oil production facility A to an oil-refining facility B, before the step of removing the organic acid from the crude oil 41, whereby the gas hydrate inhibitor 46a is introduced to the crude oil 41 during the transport step.

Based on the test results according to an embodiment of the present invention, the catalyst used herein is preferably TPA (tungstophosphoric acid), and more preferably TPA loaded in an amount of 5~30 wt % on γ-$Al_2O_3$, based on the amount of γ-$Al_2O_3$.

The gas hydrate inhibitor is preferably introduced at a mass ratio of 0.0085~0.05 relative to the mass of crude oil and the step of removing the organic acid is preferably performed at 220~300° C.

Advantageous Effects

According to the present invention, the method of removing organic acids from crude oil using a gas hydrate inhibitor and a catalyst includes reacting crude oil with a gas hydrate inhibitor such as MEG (Mono-ethylene glycol), DEG (Di-ethylene glycol), TEG (Tri-ethylene glycol), methanol or derivatives thereof in the presence of a catalyst during the treatment of crude oil in crude oil production facilities or oil-refining facilities, whereby the organic acids can be removed from the crude oil and thus the acidity of crude oil can be lowered by 93% or more.

Also, the catalyst includes TPA (tungstophosphoric acid), rather than an alkaline earth metal-based catalyst including magnesium (Mg), thereby preventing the catalyst from being deactivated.

Furthermore, a continuous process is achieved in such a manner that the gas hydrate inhibitor and the catalyst are not discarded but are collected from the crude oil from which organic acids have been removed, and are thus recycled for the removal of organic acids from crude oil, thereby realizing the environmentally friendly, economical and efficient removal of organic acids from crude oil.

Moreover, the amount of TPA catalyst loaded on metal, the weight ratio of gas hydrate inhibitor and the reaction temperature are optimally set, thereby maximizing the removal efficiency of organic acids from crude oil.

MODE FOR INVENTION

Hereinafter, a detailed description will be given of preferred embodiments of the present invention with reference to the appended drawings. Before preferred embodiments of the present invention are described in more detail, it must be noted that the terms and words used in the present specification and claims should not be interpreted as being limited to typical meanings or dictionary definitions, but should be interpreted as having meanings and concepts relevant to the technical scope of the present invention.

The reference numerals in individual steps are used for the sake of description, and do not indicate the order of the steps. Individual steps may be performed differently from the described order unless the specific order is explicitly stated in context. That is, individual steps may be performed in the described order or in the reverse order, or may be substantially simultaneously conducted.

The present invention is not to be construed as limiting the specific embodiments and description, and may be variously modified by those skilled in the art without departing from the scope of the invention as disclosed in the accompanying claims, and such modifications will fall within the scope of the present invention.

Figure 1:
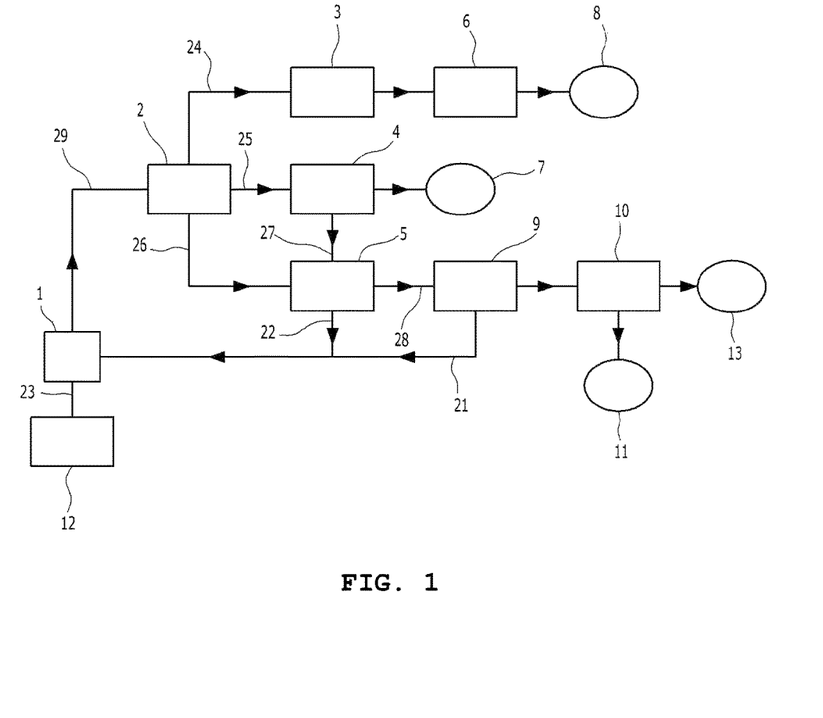
FIG. 1 schematically shows the process including removing an organic acid from crude oil using a gas hydrate inhibitor and a catalyst in a crude oil production facility and then collecting and recycling the unreacted gas hydrate inhibitor 21 and catalyst 22 according to an embodiment of the present invention.

FIG. 1 schematically shows the process including removing an organic acid from crude oil using a gas hydrate inhibitor and a catalyst in a crude oil production facility and then collecting and recycling the unreacted gas hydrate inhibitor 21 and catalyst 22 according to an embodiment of the present invention.

FIG. 1 shows the process that may be performed in a typical crude oil production facility for drilling or extracting crude oil installed on the land or sea, and such a process may also be applied to an oil-refining facility.

Specifically, crude oil is drilled or extracted from an oil well 12, after which the steps of introducing crude oil 23 with a gas hydrate inhibitor 21 and a catalyst 22 and removing an organic acid through reaction of the crude oil 23 and the gas hydrate inhibitor 21 are performed.

During the step of removing the organic acid, the crude oil 23 and the gas hydrate inhibitor 21 are reacted in the presence of the catalyst 22, whereby the organic acid is removed from the crude oil and thus the acidity of the crude oil 23 is lowered.

The gas hydrate inhibitor 21 may be first introduced, after which the catalyst 22 may be introduced, the catalyst 22 may be first introduced, after which the gas hydrate inhibitor 21 may be introduced, or the gas hydrate inhibitor 21 and the catalyst 22 may be introduced together. Here, the sequence of introduction thereof is not particularly limited.

The gas hydrate inhibitor 21 may include at least one selected from among mono-ethylene glycol (MEG), di-ethylene glycol (DEG), tri-ethylene glycol (TEG), methanol and derivatives thereof, and mixtures thereof may also be included.

The gas hydrate inhibitor is preferably introduced at a mass ratio of 0.0085~0.05 relative to the mass of the crude oil.

The catalyst 22 may include tungstophosphoric acid (TPA), and 2-tungstophosphoric acid is more preferably used.

As the catalyst, TPA loaded in an amount of 5~30 wt % on $\gamma$-$Al_2O_3$, based on the amount of $\gamma$-$Al_2O_3$, is preferably used.

In addition to the TPA, the catalyst may include magnesium (Mg), tin (Sn), metal supports containing the same or derivatives thereof, and the kinds thereof are not limited.

When the step of removing the organic acid is performed at 220° C.~300° C., the organic acid may be very efficiently removed.

The step of removing the organic acid may be conducted using a reactor 1 having functions of stirring and reaction temperature control.

The crude oil 29, subjected to the step of removing the organic acid, is separated into a gas phase 24, an oil phase 25 and a water phase 26 in a separator 2. Here, the separator 2 preferably includes, for example, a 3-stage separator that enables three-phase separation, but is not limited thereto, and a 2-stage separator may be used.

The separated gas phase 24 may be subjected to gas compression in a compressor 3 and then dehydration in a dehydration unit 6, and may be supplied to a gas retailer 8.

The separated oil phase 25 may be treated to separate water 27 therefrom in an oil treatment unit 4, and the oil, from which the water 27 has been completely removed, may be supplied to an oil retailer 7.

The separated water phase 26 and the separated water 27 may be separated into a catalyst 22 and wastewater 28 in a catalyst separator 5.

The separated wastewater 28 may contain the unreacted gas hydrate inhibitor such as MEG, etc. during the step of removing the organic acid, and such a gas hydrate inhibitor may be separated in a non-reactant separator 9. The wastewater, from which the gas hydrate inhibitor 21 has been separated, is treated to remove impurities therefrom in a water treatment unit 10 and is then supplied to a drainage facility 11. The impurities are fed to an impurity treatment portion 13 and are thus discarded, or are recycled for other uses.

The gas hydrate inhibitor 21 and the catalyst 22 thus separated may be recycled by being fed again to crude oil 23 newly supplied from the oil well 12.

The above process may also be applied to land or offshore oil-refining facilities for refining oil, etc.

Figure 2:
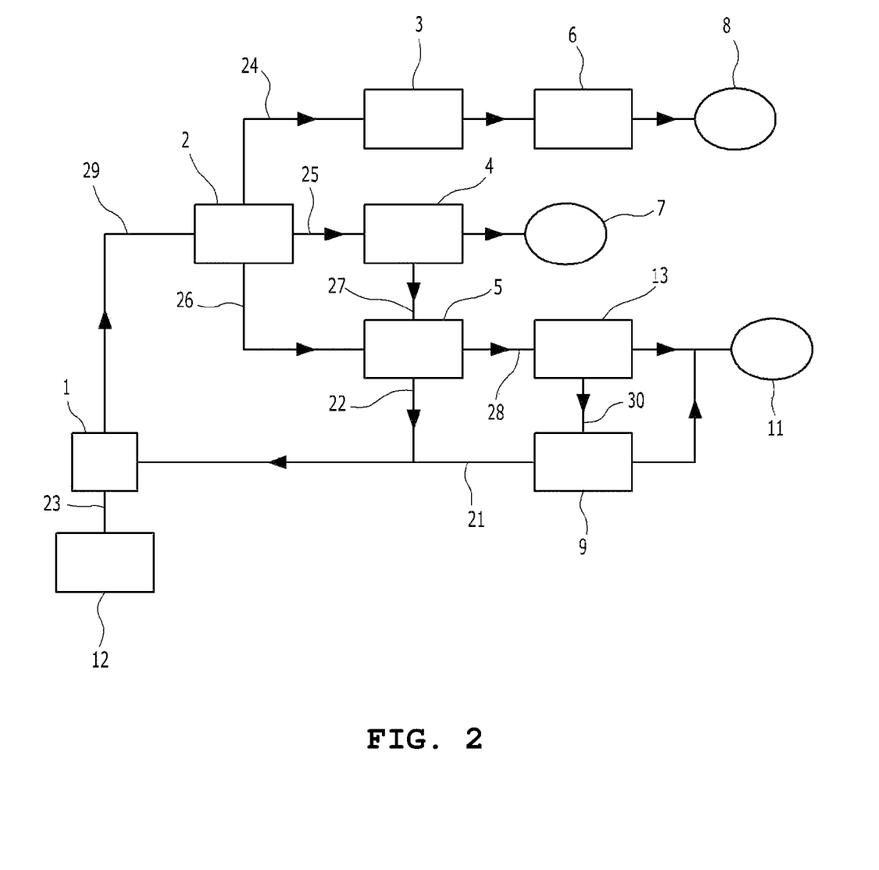
FIG. 2 schematically shows the process of removing an organic acid from crude oil using a gas hydrate inhibitor and a catalyst in a crude oil production facility as shown in FIG. 1, in which wastewater 28 is first water-treated in a water treatment unit 10 and then the gas hydrate inhibitor 21 is separated, unlike the process of FIG. 1.

FIG. 2 schematically shows the process of removing an organic acid from crude oil using a gas hydrate inhibitor and a catalyst in a crude oil production facility as shown in FIG. 1, in which wastewater 28 is first water-treated in a water treatment unit 10, after which the gas hydrate inhibitor 21 is separated, unlike the process of FIG. 1.

During the process of FIG. 2, the wastewater 28 separated in a catalyst separator 5 is first water-treated in a water treatment unit 10. The water treatment step includes all procedures that may affect water quality, including removing impurities, and the impurities may include materials such as solids, metal powder or suspended materials.

The water-treated wastewater 30 is fed to a non-reactant separator 9 to separate remaining water and the unreacted gas hydrate inhibitor 21 such as MEG, etc. therefrom.

The separated remaining water and the impurities separated in the water treatment step are supplied to a drainage treatment portion 14 and are thus additionally purified or discarded.

Since the gas hydrate inhibitor such as MEG, etc., which is water-soluble, is a material that is efficiently dissolved in water, the water treatment step as above proceeds to remove insoluble impurities from the wastewater 28, thereby increasing the separation efficiency in the non-reactant separator 9.

Similarly, the gas hydrate inhibitor 21 thus separated is fed together with the catalyst 22 to crude oil 23 newly supplied from the oil well 12, and may thus be recycled, and steps not mentioned above may be configured in the same manner as the steps shown in FIG. 1.

Figure 3:
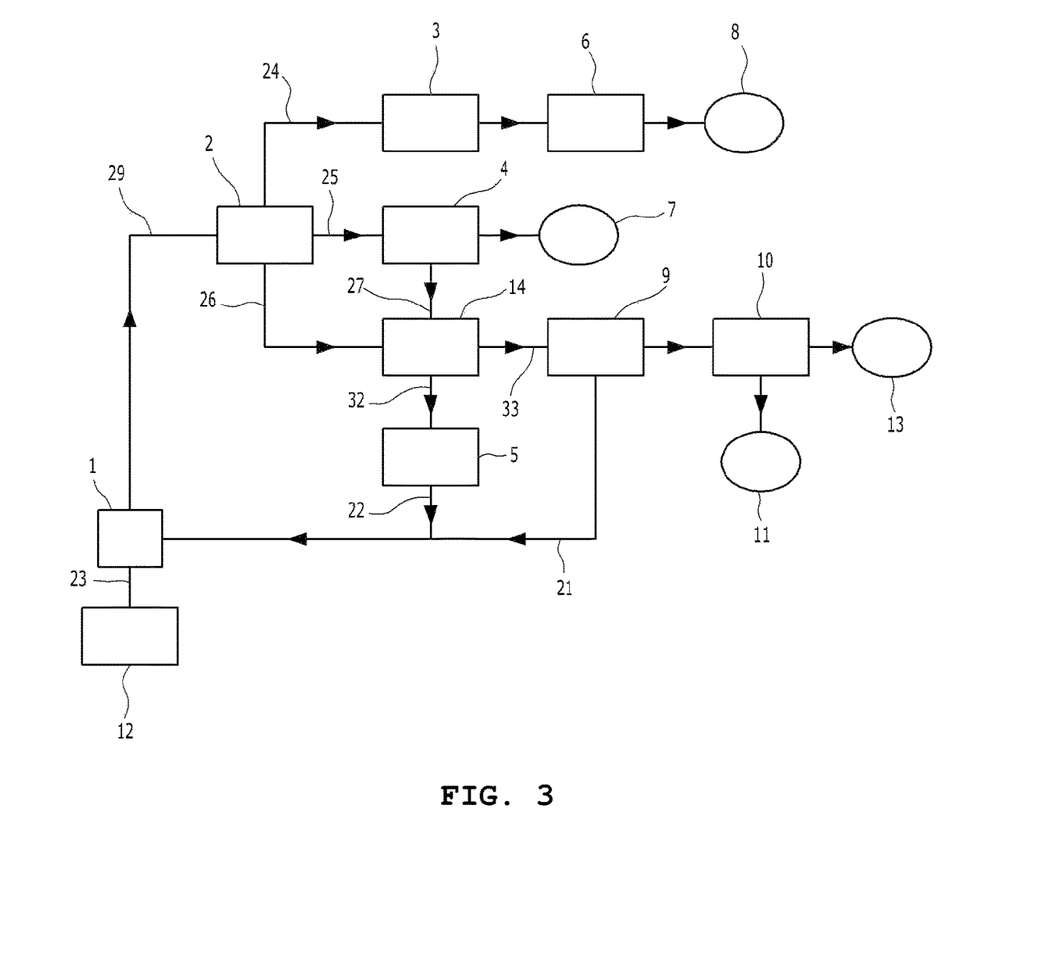
FIG. 3 schematically shows the process of removing an organic acid from crude oil using a gas hydrate inhibitor and a catalyst in a crude oil production facility, as shown in FIG. 1, in which a water phase 26 separated in a separator 2 and water 27 separated in an oil treatment unit 4 are first water-treated in a water treatment unit 10, after which the gas hydrate inhibitor 21 and the catalyst 22 are separated, unlike the process of FIG. 1.

FIG. 3 schematically shows the process of removing an organic acid from crude oil using a gas hydrate inhibitor and a catalyst in a crude oil production facility as shown in FIG. 1, in which a water phase 26 separated in a separator 2 and water 27 separated in an oil treatment unit 4 are first water-treated in a water treatment unit 10, after which the gas hydrate inhibitor 21 and the catalyst 22 are separated, unlike the process of FIG. 1.

The water treatment step is performed in a manner in which the water phase 26 and the water 27 are introduced to the water treatment unit 10 and are thus separated into a slurry phase 32 and a water phase 33.

The catalyst 22 contained in the separated slurry phase 32 is separated in the catalyst separator 5, and the slurry remainder obtained after the separation of the catalyst may be discarded or may be recycled for other uses.

The water-treated water phase 33 may be introduced to the non-reactant separator 9 so that the unreacted gas hydrate inhibitor 21 such as MEG, etc. is separated therefrom.

Similarly, the gas hydrate inhibitor 21 thus separated is fed together with the catalyst 22 to crude oil 23 newly supplied from the oil well 12, and may thus be recycled, and steps not mentioned above may be configured in the same manner as the steps shown in FIG. 1.

Figure 4:
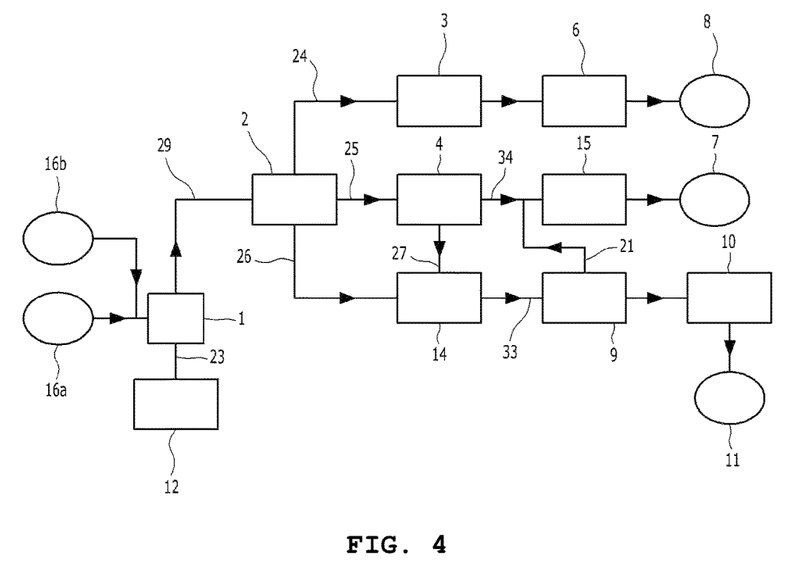
FIG. 4 schematically shows the process of removing an organic acid from crude oil using a gas hydrate inhibitor and a catalyst in a crude oil production facility as shown in FIG. 1, in which the organic acid left behind in the crude oil 29 subjected to the step of removing the organic acid is additionally removed, unlike the process of FIG. 1.

FIG. 4 schematically shows the process of removing an organic acid from crude oil using a gas hydrate inhibitor and a catalyst in a crude oil production facility as shown in FIG. 1, in which the organic acid left behind in the crude oil 29 subjected to the step of removing the organic acid is additionally removed, unlike the process of FIG. 1.

Specifically, crude oil is drilled or extracted from an oil well 12, after which the step of removing organic acid is performed in a manner in which crude oil 23 is introduced with a gas hydrate inhibitor 16a and a catalyst 16b in a first reactor 1.

The crude oil 29 subjected to the step of removing the organic acid is separated into a gas phase 24, an oil phase 25 and a water phase 26 in a separator 2.

The separated oil phase 25 may be treated to separate water 27 therefrom in an oil treatment unit 4. The oil 34, from which water has been completely separated, is treated to additionally remove the organic acid therefrom in a second reactor 15 using a gas hydrate inhibitor 21, which will be described later.

In addition to the above sequence, the process may be configured such that additionally removing the organic acid from the separated oil phase 25 using the gas hydrate inhibitor 21 in the second reactor 15 and then separating the water 27 in the oil treatment unit 4 are performed.

The oil, from which the organic acid has been additionally removed, has acidity lower than that of the oil produced during the processes of FIGS. 1 to 3, and is supplied to an oil retailer 7.

The separated water 27 is fed to the water treatment unit 10 so as to be water-treated, thereby separating the water phase 33 from the impurities, and the water-treated water phase 33 is fed to the non-reactant separator 9, and thus the unreacted gas hydrate inhibitor 21 such as MEG, etc. is separated therefrom. The impurities separated in the water treatment unit 10 are fed to the impurity treatment portion 13.

The gas hydrate inhibitor 21 thus separated is used for the aforementioned step of additionally removing the organic acid, and steps not mentioned above may be configured in the same manner as the steps shown in FIG. 1.

Figure 5:
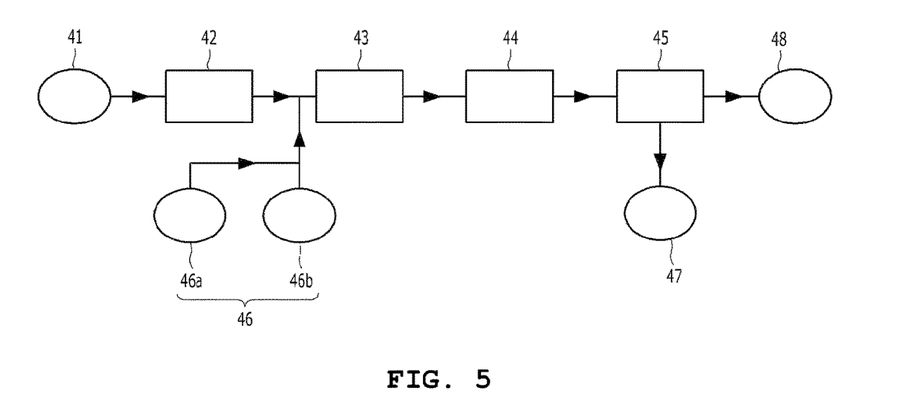
FIG. 5 schematically shows the process including removing an organic acid from crude oil using a gas hydrate inhibitor and a catalyst in an oil-refining facility and then collecting the unreacted gas hydrate inhibitor and catalyst according to an embodiment of the present invention.

FIG. 5 schematically shows the process including removing an organic acid from crude oil using a gas hydrate inhibitor and a catalyst in an oil-refining facility and then collecting the unreacted gas hydrate inhibitor and catalyst according to an embodiment of the present invention, and the process of FIG. 5 may be applied to general oil-refining facilities for refining crude oil and also to oil wells and crude oil production facilities.

The crude oil 41 supplied to crude oil production facilities or oil-refining facilities may be first desalted in a desalter 42.

When crude oil is transported using oil tank ships, seawater is used as ballast water, and thus chlorides of sodium (Na), magnesium (Mg) or calcium (Ca) may be contained in the crude oil. In the case where such chlorides participate in oil-refining processes, scale may accumulate in a heat exchanger or the like, and problems pertaining to corrosion in plants owing to generation of hydrochloric acid (HCl) due to hydrolysis and coke formation in a heater may occur. Hence, it is necessary to desalt the crude oil.

The desalted crude oil is subjected to the steps of introducing a gas hydrate inhibitor 46a and a catalyst 46b and removing an organic acid through reaction with the gas hydrate inhibitor 46a in a reactor 44.

The gas hydrate inhibitor 46a and the catalyst 46b may be sequentially or simultaneously introduced, and the sequence of introduction thereof is not limited.

During the step of removing the organic acid, the crude oil and the gas hydrate inhibitor 46a are reacted in the presence of the catalyst 46b, whereby the organic acid is removed from the crude oil and thus the acidity of the crude oil is lowered.

The gas hydrate inhibitor may include at least one selected from among MEG (Mono-ethylene glycol), DEG (Di-ethylene glycol), TEG (Tri-ethylene glycol), methanol and derivatives thereof, and mixtures thereof may also be included.

The gas hydrate inhibitor is preferably introduced at a mass ratio of 0.0085~0.05 relative to the mass of the crude oil.

The catalyst may include TPA (tungstophosphoric acid), and 2-tungstophosphoric acid is more preferably used.

As the catalyst, TPA loaded in an amount of 5~30 wt % on $\gamma$-$Al_2O_3$, based on the amount of $\gamma$-$Al_2O_3$, is preferably used.

In addition to the TPA, the catalyst may include magnesium (Mg), tin (Sn), metal supports containing the same or derivatives thereof, and the kinds thereof are not limited.

When the step of removing the organic acid is performed at 220° C.~300° C., the organic acid may be very effectively removed.

The crude oil, the acidity of which is lowered through the step of removing the organic acid, is subjected to atmospheric distillation in a distillation unit 45 to separate the unreacted gas hydrate inhibitor and catalyst 47 therefrom. Thereby, low-acidity crude oil 48 is obtained.

In order to more efficiently perform the atmospheric distillation, the crude oil may be heated in a preheater 43 and then placed in the distillation unit. Here, the heating step may be performed before or after the step of removing the organic acid.

The above process may also be applied to crude oil production facilities such as oil wells, land plants or offshore plants.

Figure 6:
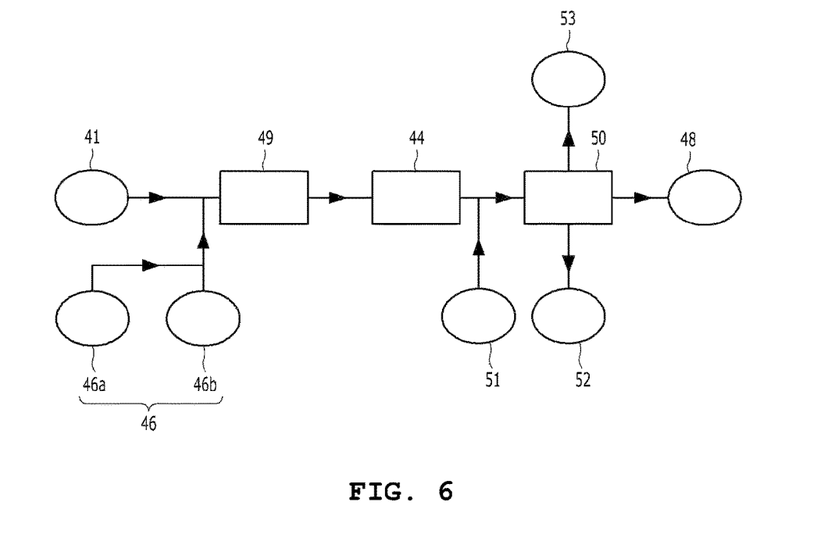
FIG. 6 schematically shows the process of removing an organic acid from crude oil using a gas hydrate inhibitor and a catalyst in an oil-refining facility as shown in FIG. 5, in which water 51 is further added, unlike the process of FIG. 5.

FIG. 6 schematically shows the process of removing an organic acid from crude oil using a gas hydrate inhibitor and a catalyst in an oil-refining facility as shown in FIG. 5, in which water 51 is further added, unlike the process of FIG. 5.

The crude oil 41 supplied to the oil-refining facility is subjected to the step of removing an organic acid through reaction with a gas hydrate inhibitor 46a and a catalyst 46b in a reactor 44.

The crude oil introduced with the gas hydrate inhibitor and catalyst 46 may be mixed in a mixing unit 49 before being placed in the reactor.

The crude oil, from which the organic acid has been removed through the step of removing the organic acid, is desalted in a desalter 50 by the addition of water 51. During the desalting step, a mixture 52 comprising the unreacted gas hydrate inhibitor, catalyst and water is separated from the crude oil, thus obtaining low-acidity crude oil 48. Also, during the desalting step, offgas 53 may be additionally separated.

In lieu of the desalting step, the crude oil may be subjected to atmospheric distillation in the distillation unit to separate the unreacted gas hydrate inhibitor and catalyst.

Figure 7:
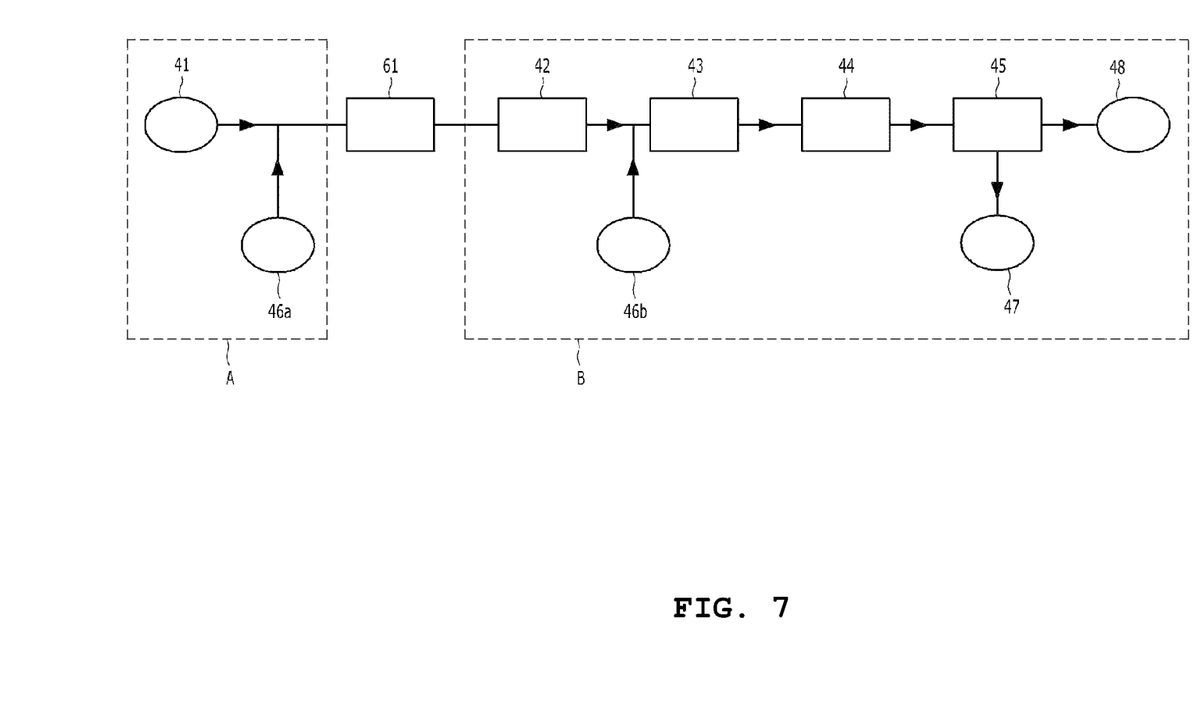
FIG. 7 schematically shows the process including transport of crude oil from a crude oil production facility A to an oil-refining facility B and treatment thereof according to another embodiment of the present invention.

FIG. 7 schematically shows the process including transport of crude oil from a crude oil production facility A to an oil-refining facility B and treatment thereof according to another embodiment of the present invention.

The crude oil 41 produced in the crude oil production facility A is transported to the oil-refining facility B via the transport means 61. Here, the gas hydrate inhibitor 46a may be introduced to the crude oil during the transport step.

The crude oil transported to the oil-refining facility B is introduced with the catalyst 46b and is thereby reacted with the gas hydrate inhibitor, which was introduced during the transport step. The other steps may be configured in the same manner as the steps of FIGS. 1 to 6.

The crude oil is typically transported to the oil-refining facility via a pipeline, an oil tank truck or an oil tank ship. When the transport conditions are low temperature and high pressure, a gas hydrate may be formed.

The gas hydrate is a solid material, and is configured such that small gas molecules such as methane, ethane, propane, carbon dioxide, and the like are physically bonded to the voids in the three-dimensional lattice structures formed by the hydrogen bonds between water molecules, rather than being chemically bonded. Since such a gas hydrate may block pipes or damage storage tanks, it must be prevented from being formed using an inhibitor.

In the present invention, MEG, DEG, TEG, methanol or derivatives thereof are gas hydrate inhibitors that are effective at preventing the formation of gas hydrate.

Therefore, during the transport of the crude oil, the gas hydrate inhibitor may be introduced and may thus be utilized as an inhibitor for preventing the formation of gas hydrate, and in the oil-refining facility, the catalyst is introduced so as to induce the reaction for removing the organic acid, thereby making it possible to realize a continuous process using the gas hydrate inhibitor as an organic acid removing agent.

As described above, when the crude oil is reacted with the gas hydrate inhibitor such as MEG, etc., the organic acid may be removed from the crude oil, and moreover, organic acids contained in all hydrocarbon-based oils, including biodiesel, vacuum residue, unconventional oil and shale oil, in addition to the crude oil, may be removed.

Furthermore, the above process may be applied not only to the crude oil production facility and the oil-refining facility, but also to land plants or offshore plants.

A better understanding of the present invention will be given through the following examples regarding tests for measuring the removal efficiency of organic acid from crude oil depending on the amount of the catalyst loaded on metal, the weight ratio of the gas hydrate inhibitor, the reaction temperature, and the kind of the gas hydrate inhibitor.

EXAMPLE 1

<Removal Efficiency of Organic Acid from Crude Oil Depending on the Amount of Catalyst Loaded on Metal>

In the present test, a precursor including 2-tunstophosphoric acid (TPA) particles was dissolved in water to give a liquid or slurry, which was then mixed with $\gamma$-$Al_2O_3$ powder through typical wet impregnation, thus preparing a catalyst, which was then dried at 120° C. for 12 hr and pretreated through oxidation at 400° C. for 4 hr. The catalyst loaded on the support was used at a mass ratio of 0.0085 relative to the mass of the crude oil.

As the gas hydrate inhibitor, mono-ethylene glycol (MEG) was used at a mass ratio of 0.05 relative to the mass of the crude oil, and as the crude oil, 50 g of high-acidity crude oil having a TAN of 5 was used.

The crude oil, the gas hydrate inhibitor and the catalyst were placed in an autoclave at 300° C. under high pressure and reacted for 10 min with stirring at 800 rpm. After the termination of the reaction, the product was rapidly cooled to room temperature using cooling water.

The product at room temperature was obtained in the reactor, and the unreacted gas hydrate inhibitor (MEG) and catalyst (TPA) were removed using a centrifuge, after which the removal of the gas hydrate inhibitor (MEG) was confirmed through GC-Mass analysis.

The value of TAN in the crude oil thus obtained was measured in accordance with ASTM D664 for measuring organic acid content.

In order to measure the removal efficiency of the organic acid from the crude oil depending on the amount of the catalyst loaded on the metal, the organic acid removal efficiency was measured at different weight ratios (W/R, wt %) of TPA and $\gamma$-$Al_2O_3$. The results are summarized in Table 1 below. Here, 50 g of crude oil having a TAN of 5 (before reaction) was used, a reaction time of 10 min and a stirring rate of 800 rpm were fixed, and the ratio of gas hydrate inhibitor (MEG) to crude oil was fixed to 0.05, after which the reaction temperature was uniformly maintained at 300° C. (50 g of crude oil, TAN of 5 before reaction, reaction time of 10 min, stirring rate of 800 rpm, reaction temperature of 300° C., catalyst/crude oil=0 or 0.0085, MEG/crude oil=15 wt %).

TABLE 1

| Catalyst/ crude oil | W/R | TAN (after reaction) | Organic acid removal efficiency (%) |
|---|---|---|---|
| Catalyst non-used | | 2.510 | 49.86 |
| 0.0085 | 0 | 1.580 | 68.40 |
| | 1 | 1.440 | 71.20 |
| | 5 | 0.903 | 81.94 |
| | 15 | 0.363 | 92.74 |
| | 30 | 0.665 | 85.00 |
| | 35 | 0.790 | 84.21 |

As is apparent from the results of Table 1, a high organic acid removal effect of 80% or more was exhibited from TPA of 5 wt %. However, when the amount of TPA exceeded 30 wt %, high catalyst preparation costs resulted, thus negating economic benefits, which is not efficient.

Therefore, the use of the catalyst configured such that TPA was loaded in an amount of 5~30 wt % on $\gamma$-$Al_2O_3$ was the most effective at removing the organic acid.

EXAMPLE 2

<Removal Efficiency of Organic Acid from Crude Oil Depending on the Weight Ratio of Gas Hydrate Inhibitor>

In order to measure the removal efficiency of the organic acid from the crude oil depending on the weight ratio of the gas hydrate inhibitor, testing was performed at different weight ratios of MEG relative to crude oil, and a catalyst configured such that 15 wt % of TPA was loaded on $\gamma$-$Al_2O_3$ (W/R=15 wt %) was used, and the other test conditions were the same as in Example 1 (50 g of crude oil, TAN of 5 before reaction, reaction time of 10 min, stirring rate of 800 rpm, reaction temperature of 300° C., catalyst/crude oil=0.0085, TPA/$\gamma$-$Al_2O_3$=15 wt %). The test results are shown in Table 2 below.

TABLE 2

| Catalyst/ crude oil | MEG/ crude oil | TAN (after reaction) | Organic acid removal efficiency (%) |
|---|---|---|---|
| 0.0085 | 0.0050 | 1.634 | 67.32 |
| | 0.0085 | 1.015 | 79.70 |
| | 0.0120 | 0.873 | 82.54 |
| | 0.0250 | 0.363 | 92.74 |

TABLE 2-continued

| Catalyst/ crude oil | MEG/ crude oil | TAN (after reaction) | Organic acid removal efficiency (%) |
|---|---|---|---|
| | 0.0500 | 0.304 | 93.92 |
| | 0.0650 | 0.295 | 94.10 |

As is apparent from Table 2, a high organic acid removal effect of about 80% or more was exhibited from the 0.0085 mass ratio of MEG relative to the crude oil. However, when the mass ratio of MEG exceeded 0.05, high costs resulted, thus negating economic benefits, which is not efficient.

Therefore, the use of the gas hydrate inhibitor MEG at a mass ratio of 0.0085 to 0.05 relative to the mass of the crude oil was the most effective at removing the organic acid.

EXAMPLE 3

<Removal Efficiency of Organic Acid from Crude Oil Depending on the Reaction Temperature>

In order to measure the removal efficiency of the organic acid from the crude oil depending on the reaction temperature, testing was performed at different reaction temperatures in the autoclave, and the gas hydrate inhibitor MEG was used at a mass ratio of 0.025 relative to the mass of the crude oil, and the catalyst/crude oil ratio was fixed to 0.0085 and the TPA/$\gamma$-$Al_2O_3$ (W/R) was fixed to 15 wt %, and the other test conditions were the same as in Example 2 (50 g of crude oil, TAN of 5 before reaction, reaction time of 10 min, stirring rate of 800 rpm, catalyst/crude oil=0.0085, TPA/$\gamma$-$Al_2O_3$=15 wt %, MEG/crude oil=0.025). The results are summarized in Table 3 below.

TABLE 3

| Reaction temperature (° C.) | TAN (after reaction) | Organic acid removal efficiency (%) |
|---|---|---|
| 80 | 4.826 | 3.28 |
| 100 | 4.640 | 7.20 |
| 120 | 4.239 | 15.22 |
| 180 | 3.398 | 32.04 |
| 220 | 1.362 | 72.76 |
| 260 | 0.801 | 83.98 |
| 300 | 0.363 | 92.74 |
| 325 | 1.562 | 68.76 |
| 350 | 2.801 | 43.98 |

As is apparent from the correlation between the reaction temperature and the organic acid removal efficiency based on the above test results, the organic acid removal efficiency was drastically increased from a reaction temperature of about 180° C., and reached 70% or more at a reaction temperature of about 220° C. or more.

However, when the reaction temperature was higher than 300° C., the organic acid removal efficiency began to drastically decrease. Furthermore, when the reaction temperature is too high, naphthenic acid may cause metal to corrode through reaction with the metal surface in crude oil production facilities or oil-refining facilities. In order to prevent such corrosion, a material having high corrosion resistance has to be used, which is expensive, undesirably increasing facility costs.

Therefore, the removal of the organic acid was the most efficient at a reaction temperature ranging from 220 to 300° C.

EXAMPLE 4

<Removal Efficiency of Organic Acid from Crude Oil Depending on the Kind of Gas Hydrate Inhibitor>

In order to measure the removal efficiency of organic acid from crude oil depending on the reaction temperature, testing was performed using the gas hydrate inhibitor, such as di-ethylene glycol (DEG), tri-ethylene glycol (TEG) or methanol, in addition to MEG, at a mass ratio of 0.025 relative to the mass of crude oil, and the reaction temperature, the reaction time, and the other test conditions including the crude oil used for reaction and the TAN thereof were set as in Example 3 (50 g of crude oil, TAN of 5 before reaction, reaction time of 10 min, reaction temperature of 300° C., stirring rate of 800 rpm, catalyst/crude oil=0.0085, TPA/$\gamma$-$Al_2O_3$=15 wt %, gas hydrate inhibitor/crude oil=0.025). The test results are summarized in Table 4 below.

TABLE 4

| Kind of gas hydrate inhibitor | TAN (after reaction) | Organic acid removal efficiency (%) |
|---|---|---|
| MEG | 0.363 | 92.74 |
| DEG | 1.009 | 79.82 |
| TEG | 1.195 | 76.10 |
| Methanol | 0.494 | 90.12 |

As is apparent from the organic acid removal efficiency depending on the kind of gas hydrate inhibitor based on the test results of Table 4, the organic acid was effectively removed from the crude oil when using not only MEG but also DEG, TEG and methanol as the gas hydrate inhibitor.

DESCRIPTION OF REFERENCE NUMERALS IN THE DRAWINGS

1: reactor
2: separator
3: compressor
4: oil treatment unit
5: catalyst separator
6: dehydration unit
7: oil retailer
8: gas retailer
9: non-reactant separator
10: water treatment unit
11: drainage facility
12: oil well
13: impurity treatment portion
14: drainage treatment portion
15: second reactor
16a: gas hydrate inhibitor
16b: catalyst
21: gas hydrate inhibitor
22: catalyst
23: crude oil
24: gas phase
25: oil phase
26: water phase
27: water
28: wastewater
29: crude oil from which organic acid has been removed
30: water-treated wastewater
32: slurry phase
33: water-treated water phase and water
34: oil phase from which water has been separated
41: crude oil
42: desalter
43: preheater
44: reactor
45: distillation unit
46a: gas hydrate inhibitor
46b: catalyst
47: gas hydrate inhibitor, catalyst
48: low-acidity crude oil
49: mixing unit
51: water
52: gas hydrate inhibitor, catalyst and water
53: offgas
61: transport means
A: crude oil production facility
B: oil-refining facility

INDUSTRIAL APPLICABILITY

The present invention is directed to, as the method of treating crude oil suitable for application to land or offshore crude oil production facilities or oil-refining facilities, the method of lowering the acidity of crude oil by removing organic acids from crude oil through reaction of crude oil and a gas hydrate inhibitor such as MEG (Mono-ethylene glycol), etc. in the presence of a catalyst, the method including the step of removing an organic acid from crude oil 23 using a gas hydrate inhibitor 21 and a catalyst 22. Here, the gas hydrate inhibitor can include at least one selected from the group consisting of MEG (Mono-ethylene glycol), DEG (Di-ethylene glycol), TEG (Tri-ethylene glycol), methanol and derivatives thereof. Specifically, the crude oil is allowed to react with the gas hydrate inhibitor such as MEG (Mono-ethylene glycol), DEG (Di-ethylene glycol), TEG (Tri-ethylene glycol), methanol or derivatives thereof in the presence of the catalyst, whereby the organic acid can be removed from the crude oil and thus the acidity of the crude oil can be lowered by 93% or more. Therefore, the present invention is industrially applicable.

What is claimed is:

1. A method for removing an organic acid from crude oil, comprising the steps of:
   introducing crude oil with a gas hydrate inhibitor and a catalyst; and
   removing the organic acid from the crude oil through reaction of the crude oil and the gas hydrate inhibitor,
   wherein the gas hydrate inhibitor includes at least one selected from the group consisting of mono-ethylene glycol (MEG), di-ethylene glycol (DEG), tri-ethylene glycol (TEG), methanol and derivatives thereof, and
   the gas hydrate inhibitor is introduced at a mass ratio of 0.0085-0.05 relative to a mass of the crude oil.

2. The method of claim 1, further comprising the step of:
   separating crude oil (29), subjected to the step of removing the organic acid, into a gas phase (24), an oil phase (25) and a water phase (26).

3. The method of claim 2, further comprising the steps of:
   separating water (27) from the oil phase (25); and
   separating the water phase (26) and the water (27) into a catalyst (22) and wastewater (28).

4. The method of claim 3, further comprising the steps of:
   separating a gas hydrate inhibitor (21) from the wastewater (28); and
   recycling the separated gas hydrate inhibitor (21) and the separated catalyst (22) by introduction to crude oil (23).

5. The method of claim 3, further comprising the steps of:
   water-treating the wastewater (28) to remove impurities therefrom;
   separating a gas hydrate inhibitor (21) from the water-treated wastewater (30); and recycling the separated gas hydrate inhibitor (21) and the separated catalyst (22) by introduction to crude oil (23).

6. The method of claim 2, further comprising the steps of:
separating water (27) from the oil phase (25);
water-treating the water phase (26) and the water (27) to separate a slurry phase (32) and a water phase (33) therefrom;
separating a catalyst (22) from the slurry phase (32);
separating a gas hydrate inhibitor (21) from the water phase (33); and
recycling the separated gas hydrate inhibitor (21) and the separated catalyst (22) by introduction to crude oil (23).

7. The method of claim 2, further comprising the steps of:
separating water (27) from the oil phase (25);
water-treating the water phase (26) and the water (27) to remove impurities therefrom;
separating a gas hydrate inhibitor (21) from the water-treated water phase and water (33); and
additionally removing the organic acid by introducing the separated gas hydrate inhibitor (21) to an oil phase (34) from which the water has been separated.

8. The method of claim 7, wherein the step of separating the water from the oil phase is performed after the step of additionally removing the organic acid.

9. The method of claim 1, further comprising the step of:
desalting crude oil (41) before the step of introducing the crude oil with the gas hydrate inhibitor and the catalyst.

10. The method of claim 1, further comprising the step of:
heating the crude oil before the step of removing the organic acid.

11. The method of claim 10, wherein the step of heating the crude oil is performed after the step of removing the organic acid.

12. The method of claim 1, further comprising the step of:
separating the crude oil, subjected to the step of removing the organic acid, from an unreacted gas hydrate inhibitor and catalyst (47) through atmospheric distillation.

13. The method of claim 1, further comprising the step of:
mixing the crude oil, subjected to the step of introducing the crude oil with the gas hydrate inhibitor and the catalyst, with a gas hydrate inhibitor (46*a*) and a catalyst (46*b*), which are introduced, before the step of removing the organic acid.

14. The method of claim 1, further comprising the step of:
separating the crude oil, subjected to the step of removing the organic acid, from a mixture (52) comprising an unreacted gas hydrate inhibitor, catalyst and water through desalting with water (51).

15. The method of claim 1, further comprising the step of:
transporting crude oil (41) from a crude oil production facility (A) to an oil-refining facility (B), before introducing the catalyst (46*b*),
wherein the gas hydrate inhibitor (46*a*) is introduced to the crude oil (41) during the step of transporting the crude oil.

16. The method of claim 1, wherein the catalyst is tungstophosphoric acid (TPA).

17. The method of claim 16, wherein the TPA is loaded in an amount of 5-30 wt % on $\gamma$-$Al_2O_3$, based on an amount of the $\gamma$-$Al_2O_3$.

18. The method of claim 1, wherein the step of removing the organic acid is performed at 220-300° C.

* * * * *